Aug. 2, 1966     T. L. McKAY     3,263,726

SELF-LOCKING FASTENER

Filed Feb. 12, 1964     3 Sheets-Sheet 1

INVENTOR:
Thomas L. McKay.

By Smyth, Roston & Pavitt
Attorneys

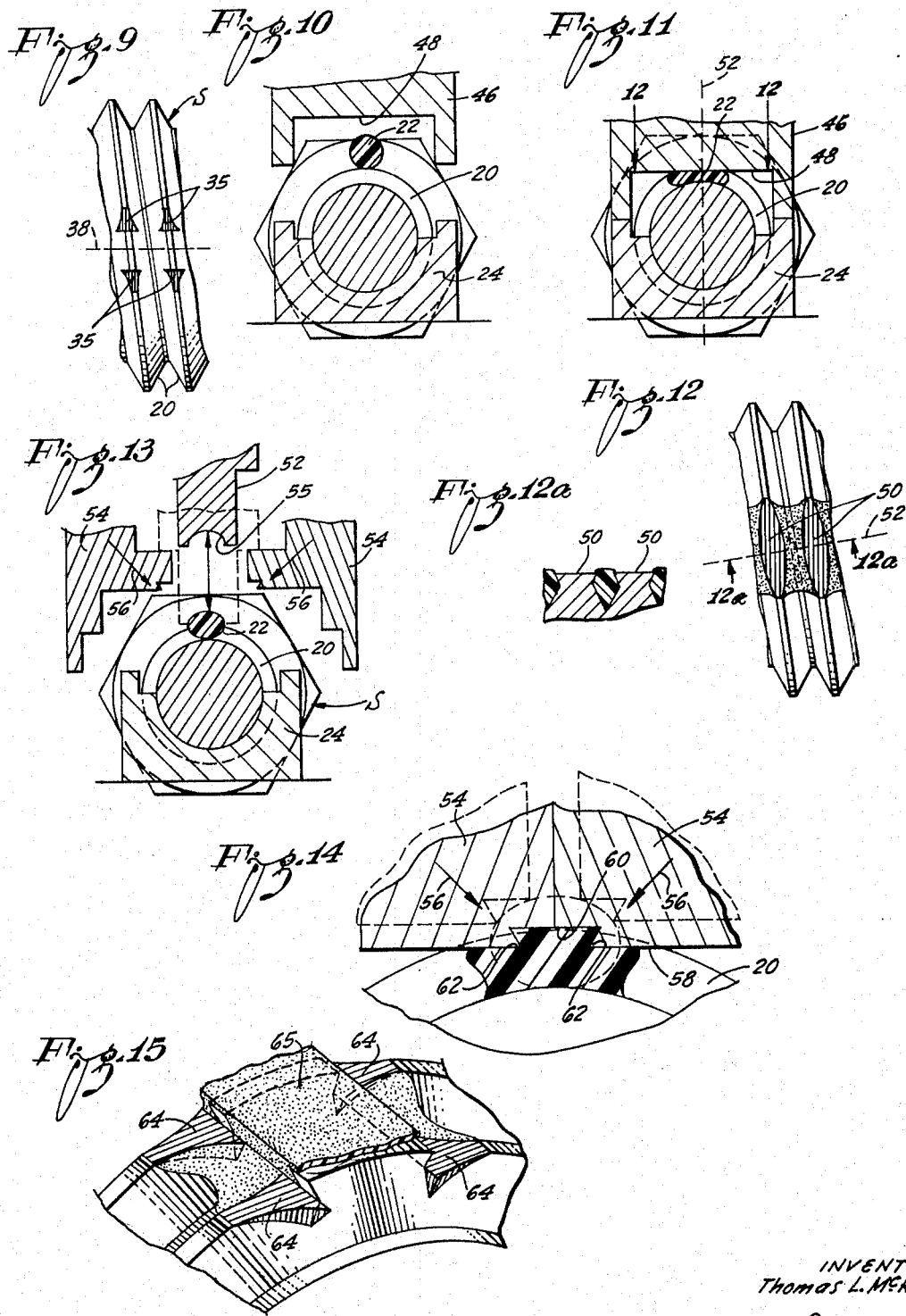

Aug. 2, 1966 T. L. McKAY 3,263,726
SELF-LOCKING FASTENER
Filed Feb. 12, 1964 3 Sheets-Sheet 3

INVENTOR.
Thomas L. McKay
By Smyth, Roston & Pavitt
Attorneys

United States Patent Office 3,263,726
Patented August 2, 1966

3,263,726
SELF-LOCKING FASTENER
Thomas L. McKay, Los Angeles, Calif., assignor to Long-Lok Corporation, Los Angeles, Calif., a corporation of California
Filed Feb. 12, 1964, Ser. No. 344,329
8 Claims. (Cl. 151—7)

This invention relates to a self-locking screw-threaded fastening member of the type in which the self-locking action is achieved by means of resiliently deformable plastic material. The fastening member may be of the general character of a screw for engagement by a complementary nut, or, conversely may be of the general character of a nut for engagement with a complementary screw.

A self-locking screw-threaded fastening member of this general type for use with a cooperating element having a complementary thread must achieve sufficiently effective frictional engagement with the complementary element to prevent loosening under the most adverse conditions, for example, conditions involving repeated varying stress and conditions involving high energy vibration. A common expedient for obtaining such frictional engagement is to insert a body of resiliently deformable plastic material between the screw thread of the fastening member and the complementary thread of the cooperating element. Thus a resilient deformable plastic insert may be added to a fastening member such as a screw for promoting frictional engagement with a cooperating nut or may be added to a nut for promoting frictional engagement with a cooperating screw.

In the usual procedure for fabricating a self-locking fastening member of this type, the fastening member is machined to provide some kind of recess for the resiliently deformable plastic body and the plastic body is installed in the recess. In a widely used construction, the recess is a longitudinal groove that intersects the turns of the screw thread of the fastening member and is deeper than the screw thread.

The operation of cutting the groove represents a substantial portion of the fabrication cost and has the further disadvantage of materially weakening the fastening member. In addition, the insert must be installed in the groove in a separate operation and, finally, in many instances an additional operation is required to anchor the installed insert in the recess.

The present invention teaches that the preliminary machining of the fastening member to form a recess may be completely eliminated. Thus the invention not only simplifies the fabrication procedure for cost reduction but also avoids weakening the screw. The invention further teaches that the resiliently deformable plastic body may be installed in only one operation if desired.

The invention is based on the concept of placing an elongated resiliently deformable plastic body longitudinally of the threaded portion of the fastening member, forcing the plastic body into the screw thread with consequent penetration of the plastic body by the turns of the screw thread as well as consequent displacement of portions of the plastic body into the valleys of the turns of the screw thread, and, while the plastic material is under compression, deforming the crests of the turns of the screw thread adjacent the plastic material in such manner that the deformations overhang the valleys of the turns of the screw thread to retain the displaced plastic portions in the valleys.

In some practices of the invention, this operation is performed in two steps, the first step being to force plastic material into engagement with the screw thread by means of one tool, the second step being to use a second tool to place the engaged body again under pressure and simultaneously to deform the crests of the turns of the screw threads to retain the plastic portions. A feature of other practices, however, is that the whole operation is carried out in a single step in which a suitable tool drives the plastic body into the screw thread and with the same stroke makes the deformations in the turns of the screw thread for anchoring the plastic material.

The invention further teaches that such an insert may be installed in substantially the same manner by dies that are employed primarily to form the screw thread by a rolling operation. In such an operation a blank screw confined between two relatively moving dies rolls along one die as the screw thread is formed. For the purpose of the present invention the plastic insert is appropriately placed in the path of the rolling screw to be picked up by the formed screw thread and then the formed screw thread is deformed in a manner to anchor the plastic material.

The various features and advantages of the invention may be understood from the following detailed description and the accompanying drawings.

In the drawings, which are to be regarded as merely illustrative:

FIG. 9 is a fragmentary enlarged plan view showing the deformations of the turns of the screw thread without the plastic material;

FIG. 10 shows an elongated plastic body positioned on a screw in preparation for installing the plastic body in a single operation by a pair of dies, the dies being shown in open position;

FIG. 11 is a similar view with the dies closed to complete the operation;

FIG. 12 is an enlarged fragmentary plan view showing a portion of the completed self-locking screw as produced by the method shown in FIGS. 11 and 12;

FIG. 12a is a fragmentary section taken along the line 12a—12a of FIG. 12;

FIG. 13 is a sectional view showing how dies may be employed in another practice of the invention;

FIG. 14 is a fragmentary sectional view on an enlarged scale showing the completion of the operation that is started in FIG. 13;

FIG. 15 is a greatly enlarged fragmentary perspective view showing the result of the method illustrated by FIGS. 13 and 14;

Figure 1:
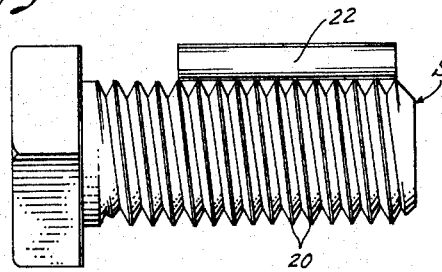
FIG. 1 is a side elevational view of a screw with an elongated body of resiliently deformable plastic material positioned longitudinally of the screw across the turns of the screw thread in preparation for carrying out the method taught by the invention.
Figure 2:
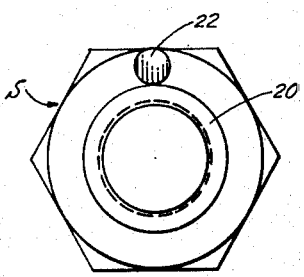
FIG. 2 is an end elevation of the assembly shown in FIG. 1.
Figure 3:
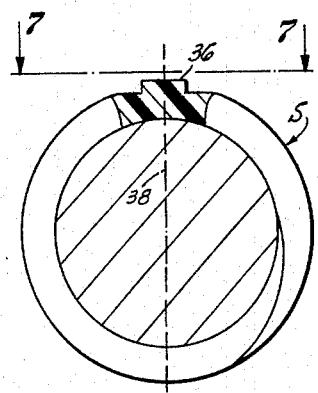
FIG. 3 is a transverse sectional view showing how the plastic body is driven into the turns of the screw thread and at the same time somewhat flattened.

FIGS. 1 and 2 shows a well known type of screw, generally designated by the letter S, the shank of the screw being formed with a conventional screw thread 20. FIGS. 1 and 2 further show an elongated body 22 of resiliently deformable plastic material of the configuration of a short rod which is positioned longitudinally of the shank of the screw along a desired longitudinal zone. The plastic material may be nylon, for example. With the elongated body of the plastic in this position, the screw S is placed in a lower die 24 which functions as a solid support for the screw and then an upper die 25 is reciprocated against the insert body to drive the plastic material into turns of the screw thread and at the same time to flatten the plastic material to the generally oval cross-sectional configuration shown in FIG. 3.

The upper die 25 has a cylindrically curved concave leading face 26 which conforms at least approximately to the curvature of the screw thread 20. Preferably the leading face 26 does not completely close against the crests of the turns of the screw thread 20 so that the result of the die operation is a series of portions of the plastic material seated in the valleys of the turns of the screw thread with the portions interconnected outside of the outside diameter of the screw thread. In other words, preferably the insert body is not crowded by the die face 26 to such extent as to cause the turns of the screw thread to divide the insert material into completely discrete portions.

Figure 7:
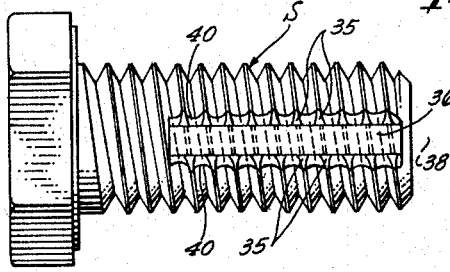
FIG. 7 is a plan view of the completed self-locking screw.
Figure 4:
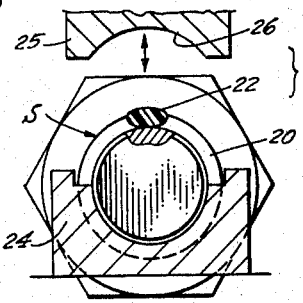
FIG. 4 is a similar view showing how die means operates on the assembly shown in FIG. 3 to compress the insert body laterally and to deform the turns of the screw thread to confine the compressed plastic material.

With the screw S still seated in the lower die 24 the lower die is moved to a new station where an upper die 28 cooperates with the lower die to complete the fabrication of the self-locking screw. The upper die 28 has a leading face 30 of concave cylindrical curvature which conforms to the curvature of the screw thread 20 and this leading face has a longitudinal flat portion 32 which is broken by a central longitudinal groove 34. When the upper die 28 closes against the lower die 24 as shown in FIG. 4 two flat areas of the upper die 28 on opposite sides of the groove 34 impinge on the crests of the turns of the screw thread to deform the screw thread, the result being two spaced rows of deformations 35 as shown in FIGS. 7 and 9. At the same time, the groove 34 in the upper die forms the plastic material into a longitudinal rib 36 shown in FIGS. 7 and 8.

Figure 6:
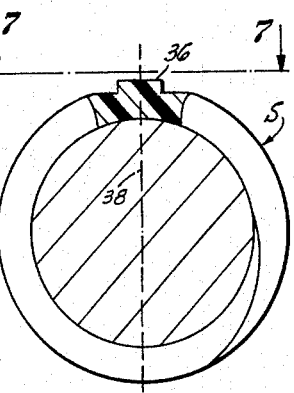
FIG. 6 is an enlarged transverse cross section of the completed self-locking screw.

The two rows of deformations 35 lie on opposite sides of a longitudinal radial plane that bisects the rib 36 longitudinally, the radial plane being indicated by the dotted lines 38 in FIGS. 6 and 9. It is to be noted that the deformations 35 in the two rows flare towards the radial plane 38. It is also to be noted that the deformations 35 are spread or expanded longitudinally of the screw to overhang the valleys of the turns of the screw thread 20 and thereby permanently retain the portions of the plastic material that are displaced into the valleys.

Figure 8:
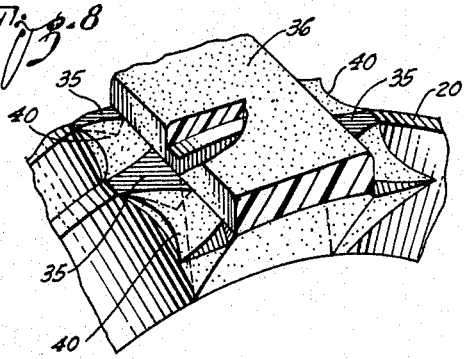
FIG. 8 is an enlarged fragmentary perspective view showing the manner in which the deformations of the turns of the screw thread retain the plastic material.

It is important to note that when the upper die 28 creates the deformations 35 it simultaneously compresses the plastic material against the periphery of the screw with the consequence that the deformations hold portions of the anchored plastic under compression. It is also to be noted, as shown in FIGS. 7 and 8, that each pair of the successive deformations 35 in each of the two rows of the two deformations form a portion of the plastic material into a dove-tail 40, the dove-tail engagement being highly effective to prevent circumferential shift of the portions of the plastic material.

Since the plastic material that forms the longitudinal rib 36 projects outwardly beyond the circumference of the crests of the screw thread 20, portions of the turns of the screw thread 20 are imbedded in the rib 36 slightly below the outer surface of the rib as may be seen in FIG. 8.

Figure 5:
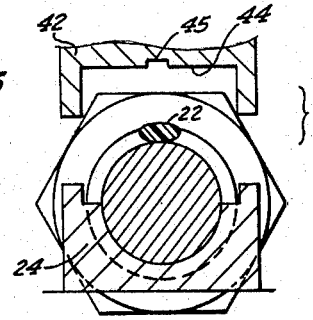
FIG. 5 is a transverse sectional view similar to FIG. 4 showing how a different die may be used to carry out the second operation.
Figure 16:
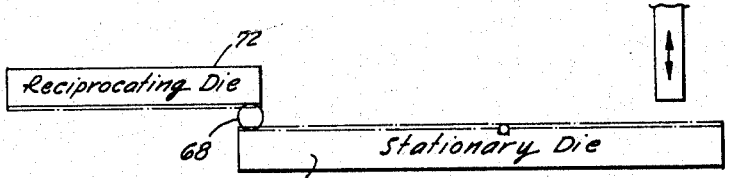
FIG. 16 is a diagrammatic elevational view showing how an operation of rolling a screw thread into a screw blank may be utilized in one practice of the invention.
Figure 17:
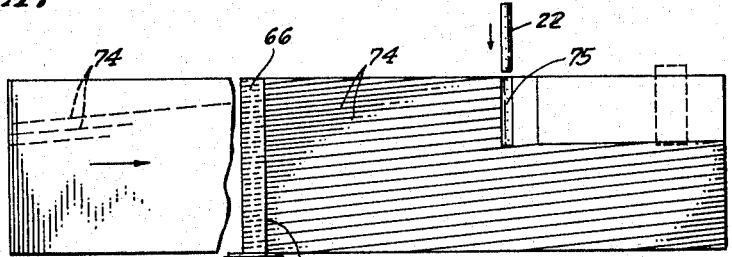
FIG. 17 is a plan view of the structure shown in FIG 16.

FIG. 5 shows how an upper die 42 may be substituted for the upper die 28 of FIG. 4 in carrying out the second step of the operation. The upper die 42 differs from the upper die 28 in having a broad flat leading face 44 with a longitudinal groove 45 formed in the face. The result of closing the die 42 against the lower die 24 is substantially the same as the result of closing the upper die 28 against the lower die 24.

It has been found that the use of the first upper die 25 may be omitted, the whole fabrication procedure being carried out with one stroke of the second upper die 28. Thus the screw S with the plastic insert body 22 positioned thereon may be placed in the lower die 24 and the fabrication procedure may be carried out solely by the second upper die 28. In such a practice of the invention the upper die 28 serves in one stroke to drive the plastic material into the turns of the screw thread and to deform the screw thread for anchorage of the plastic material. The single operation produces exactly the same product as the operation in two steps. The upper die 42 shown in FIG. 5 may also be used in conjunction with the lower die 24 to carry out the whole fabrication procedure in a single step.

FIGS. 10 and 11 show how an upper die 46 may cooperate with the lower die 24 to carry out a fabrication procedure in a single step. The upper die 46 is like the upper die 42 of FIG. 5 but has a flat face 48 that is not interrupted by a longitudinal groove. When the upper die 46 closes against the lower die 24 as shown in FIG. 11, the flat upper face 48 invades the outer circumference of the screw thread 20 and thereby deforms the turns of the screw thread in the manner indicated in FIGS. 12 and 12a. As shown in FIG. 12 the flat die face 48 produces deformations 50 in each turn of the screw thread, which deformation is of oval configuration in plan. Thus each of the deformations 50 flares towards a central radial plane indicated by dotted lines 52 in FIGS. 11 and 12. The initially round plastic body 22 is flattened as indicated in FIG. 11 and, as indicated in FIG. 12a, the turns of the screw thread divide the plastic body into discrete smaller bodies and the deformations 50 of the turns of the screw thread spread or expand longitudinally of the screw to overhang the valleys of the screw thread to retain the plastic material therein.

FIGS. 13 to 15 illustrate a practice of the invention in which the initially round plastic body is processed in two steps to produce the final product shown in FIGS. 14 and 15.

FIG. 13 shows the screw S positioned in the previously described lower die 24 for processing in sequence by a central upper die 52 and a pair of cooperating upper dies 54. The upper die 52 has a leading face 55 of cylindrically curved configuration with a relatively short radius of curvature to cause the plastic body 22 be flattened to the oval configuration shown in FIG. 13. After the upper die 52 is retracted, the pair of dies 54 converge downward in the directions of the two arrows 56. As shown in FIG. 14 the pair of dies 54 come together and simultaneously penetrate the material of the turns of the screw thread 20 to produce the final product.

It can be seen in FIG. 14 that when the pair of dies 54 close together they form a flat leading face 58 that is broken by a longitudinal groove 60. It is to be noted that the longitudinal groove 60 is of dove-tailed cross-sectional configuration so that the longitudinal die edges 62 that are formed by the groove are relatively sharp edges. As shown in FIG. 15 the dies 54 create flared deformations 64 in the turns of the screw thread that are similar in general to the previously mentioned deformations 35. It may also be seen in FIG. 15 that the final product has a longitudinal plastic rib 65 in which portions of the turns of the screw thread are imbedded.

FIGS. 16 to 19 illustrate another practice of the invention in which the screw thread 66 of a screw S is produced by a rolling action and the dies for carrying out the rolling operation are involved in the application of the plastic material to the screw.

Figure 18:
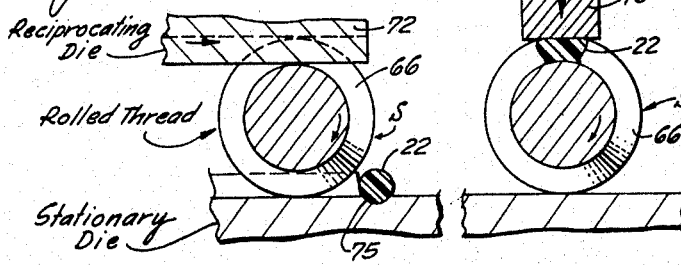
FIG. 18 is an enlarged sectional view of a portion of the structure shown in FIGS. 16 and 17 with a plastic body positioned to be picked up by the screw thread of the rolling screw.

The rolling operation is carried out in the usual manner by placing a headed screw blank 68 on a lower die 70 and then rolling the screw blank along the lower die by means of a cooperating upper die 72. The two dies are formed in the usual manner with parallel ribs 74 to create the desired helical screw thread. At a point on the lower die 70 slightly beyond the point where the formations of the screw thread are completed, the ribs 74 on the lower die terminate and a transverse groove 75 is provided to seat a previously mentioned plastic insert body 22. When the finished screw approaches the insert body 22 as shown in FIG. 18, the turns of the screw thread 66 that are formed by the rolling operation penetrate the plastic body 22 to cause the rolling screw to pick up the plastic body. Placing the insert body 22 in the groove 75 keeps the turns of the screw thread 66 from cutting entirely through the insert body.

Figure 19:
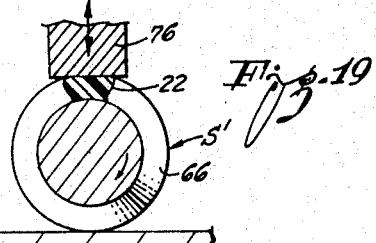
FIG. 19 is a similar sectional view showing how a die may be used to compress the plastic material and simultaneously deform the turns of the screw thread.

The rolling of the finished screw stops with the insert body 22 uppermost as shown in FIG. 19 and a simple flat die 76 is advanced against the screw in the region of the insert to form oval deformations of the configuration of the previously described deformations 50 in FIG. 12.

My description in specific detail of the selected practices of the invention will suggest various changes, substitutions and other departures from my disclosure within the spirit and scope of the appended claims.

I claim:

1. A self-locking fastening assembly for cooperation with a complementary threaded element comprising:

a fastening member formed with a screw thread for engagement with the thread of the complementary element, said screw thread being a whole screw thread with no portion of its material missing; and deformable resilient plastic material extending longitudinally of the fastening member wholly outside the root diameter of the screw thread with portions of the plastic material located in the valleys of the turns of the screw thread, the crests of successive turns of the screw thread being deformed and spread solely longitudinally of the screw, as distinguished from circumferentially of the screw, to overhang the valleys whereby portions of the plastic material in successive valleys are each engaged by confronting overhanging deformed portions of successive turns of the screw thread on opposite sides of the valley to retain said portions of the plastic material under pressure.

2. A self-locking fastening assembly for cooperation with a complementary threaded element comprising:

a fastening member formed with a screw thread for engagement with the thread of the complementary element, said screw thread being a whole screw thread with no portion of the material missing; and deformable resilient plastic material extending longitudinally of the fastening member wholly outside the root diameter of the screw thread, with portions of the plastic material in the valleys of the turns of the screw thread and with portions of the crests of the successive turns of the screw thread defining a central longitudinal zone in which said portions of the crests of the turns of the screw thread penetrate the plastic material from the underside of the plastic material, other portions of the crests of the turns of the screw thread in two additional longitudinal zones immediately adjacent the opposite sides of said central longitudinal zone being deformed with each deformation spread in opposite directions longitudinally of the screw with confronting portions of the deformations overhanging and distorting the resilient plastic material in each valley to retain the plastic material under pressure in the valley.

3. A combination as set forth in claim 2 in which said portions of the crests of the turns of the screw thread that define said central zone are free from deformation and the plastic material overlies said portions of the crests of the turns of the screw thread that are undeformed.

4. A combination as set forth in claim 2 in which the portions of the crests of the screw thread are deformed in said central longitudinal zone as well as in the additional longitudinal zones, each of the successive turns of the screw in the three zones having a single deformation of maximum width in the central zone, the plastic material being divided into discrete bodies by the deformed crests of the screw thread with each discrete body gripped by the confronting overhanging portions of crests of two successive turns of the screw thread.

5. A self-locking fastening assembly for cooperation with a complementary threaded element comprising:

a fastening member formed with a screw thread for engagement with the thread of the complementary element; and deformable resilient plastic material extending along a longitudinal zone of the fastening member wholly outside the root diameter of the screw thread with the plastic material divided into small discrete bodies by the turns of the screw thread and with the discrete bodies located in the valleys of the turns of the screw thread, successive turns of the screw thread having deformations along said zone overhanging the valleys, said deformations engaging and resiliently distorting said discrete bodies of the plastic material to retain the discrete bodies in the valleys, all of the deformations having outer surfaces in a plane that is substantially perpendicular to a longitudinal radial plane through the center of the zone, each of said outer surfaces being flared towards the radial plane.

6. A combination as set forth in claim 5 in which there is a single row of the deformations, each of said outer surfaces intersecting the radial plane and being of generally oval form.

7. A self-locking fastening assembly for cooperation with a complementary threaded element comprising:

a fastening member formed with a screw thread for engagement with the thread of the complementary element; and deformable resilient plastic material extending longitudinally of the fastening member wholly outside the root diameter of the screw thread, portions of the plastic material being in the valleys of the turns of the screw thread, portions of the crests of the successive turns of the screw thread defining a central longitudinal zone in which said portions of the crests of the turns of the screw thread penetrate the plastic material from the underside of the plastic material, the portions of the crests of the turns of the screw thread in two additional longitudinal zones immediately adjacent the opposite sides of said central longitudinal zone being deformed with the deformations spread longitudinally of the screw and overhanging and distorting the resilient plastic material in the valleys to retain the plastic material under pressure in the valleys, said portions of the crests of the turns of the screw thread that define said central zone being free from deformation, the plastic material overlying said portions of the crests of the turns of the screw thread that define said central zone, the plastic material in the central zone that overlies the undeformed crests of the successive turns of the screw thread forming a longitudinal rib with steep sides.

8. A combination as set forth in claim 7 in which said rib is of dove-tail configuration in cross section.

References Cited by the Examiner

UNITED STATES PATENTS

| | | | |
|---|---|---|---|
| 2,608,229 | 8/1952 | Brutus | 151—7 |
| 2,856,617 | 10/1958 | Widmann | 10—10 |
| 3,020,570 | 2/1962 | Wallace et al. | 10—10 |
| 3,093,177 | 6/1963 | Villo | 151—7 |
| 3,182,702 | 5/1965 | Nason et al. | 151—7 |

EDWARD C. ALLEN, *Primary Examiner.*

M. HENSON WOOD, JR., *Examiner.*

M. PARSONS, JR., *Assistant Examiner.*